United States Patent [19]

Vegas

[11] Patent Number: 4,756,505

[45] Date of Patent: Jul. 12, 1988

[54] EXPANDABLE ENCLOSURE FOR FREEZE FORMING MEAT OR POULTRY PRODUCTS

[76] Inventor: Donald Vegas, 3346 S. Aberdeen, Chicago, Ill. 60608

[21] Appl. No.: 858,947

[22] Filed: May 2, 1986

Related U.S. Application Data

[62] Division of Ser. No. 687,121, Dec. 28, 1984, Pat. No. 4,603,053.

[51] Int. Cl.⁴ .............................................. A23P 1/10
[52] U.S. Cl. ....................................... 249/82; 99/349; 99/426; 99/449; 220/19; 249/55; 249/135; 249/141; 249/167
[58] Field of Search ................... 249/55, 82, 113, 135, 249/141, 155, 157, 158, 167; 426/77, 513, 393, 524; 99/426, 449, 349; 100/910; 220/19, 306

[56] References Cited

U.S. PATENT DOCUMENTS

| | | | |
|---|---|---|---|
| 974,199 | 11/1910 | Stark et al. | 220/19 |
| 1,403,045 | 1/1922 | McHugh | 99/426 |
| 1,635,688 | 7/1927 | Ralston | 220/19 |
| 1,676,816 | 7/1928 | Briggs | 99/449 |
| 1,813,769 | 7/1931 | Riha | 426/513 |
| 2,350,427 | 6/1944 | Tichenor | 220/19 |
| 2,633,006 | 3/1953 | Taylor | 249/82 |
| 2,779,681 | 1/1957 | Sell et al. | 426/513 |
| 3,202,086 | 8/1965 | Brubaker | 249/82 |
| 3,291,873 | 12/1966 | Eakin | 249/82 |
| 3,900,129 | 8/1975 | Scholz | 220/306 |
| 4,534,286 | 8/1985 | Franzke | 100/910 |

OTHER PUBLICATIONS

Visking, 'TITE-PRESS' Machine Instruction Manual, Visking Company, Chicago, IL, Apr. 1960.

*Primary Examiner*—Jay H. Woo
*Assistant Examiner*—James C. Housel
*Attorney, Agent, or Firm*—Neuman, Williams, Anderson & Olson

[57] ABSTRACT

An expandable enclosure is provided for freeze forming a processed mass of meat or poultry products into a desirable and naturally occurring cut of meat. This enclosure includes an elongate housing with an opening for receiving the mass, a displaceable cover which the product mass displaces as it expands during freezing, and fastening apparatus for providing resistance to the separation of the cover from the housing so that the cover can maintain pressure on the mass to expel voids and excess moisture from the mass and to press the mass into the shape of the enclosure.

9 Claims, 2 Drawing Sheets

EXPANDABLE ENCLOSURE FOR FREEZE FORMING MEAT OR POULTRY PRODUCTS

This is a division of application Ser. No. 687,121, filed Dec. 28, 1984 the text of which is hereby incorporated by reference now U.S. Pat. No. 4,603,053 issued July 29, 1986.

BACKGROUND OF THE INVENTION

1. Field of the Invention

The present invention generally relates to food processing equipment and more specifically, to metal molds and a method for using these molds for shaping processed meat or poultry products.

2. Background of the Invention

In recent years it has become highly imperative that meat and poultry products be made available at a reasonable cost. One method for achieving this objective has been to create a restructured meat product which has all of the taste and nutrients of high-grade meats and poultry while being constituted of lower cost and lower grade animal parts. Prime grades of meat and poultry are desirable, but they are prohibitively expensive for many markets and applications.

Various techniques have been developed for formulating a product that looks, tastes and chews like a prime meat or poultry product but which may be fabricated at lower cost. In one prior method, for example, a restructured composite of meat products is pre-frozen until the center of the mass reaches a predetermined temperature, and then tempered through heating to achieve a uniform temperature and consistency. It is then pressed through an extruder and formed into a "log" having the cross-sectional shape of desired conventional meat cuts such as chops, strip steaks, cutlets or the like. The product, in block extruded form, is then re-frozen to hold its desired shape and then cut into controlled portions and frozen solid for shipment and display.

The major drawbacks of such a system have been the excessive amount of time and handling necessary to achieve the end product. Typically, the restructured meat or poultry product must be frozen for a period of up to a day to bring the center of the product mass down to a predetermined temperature necessary to maintain cohesiveness of the meat. As noted above, the product mass is then "tempered" by exposure to a higher ambient temperature until the temperature throughout the product mass is relatively uniform. This "tempering" may take from several hours to a day of additional time. Once the product mass is at a uniform temperature, it may be fed through an extruder and pressed into its desired shape, all the while being maintained at a predetermined low temperature necessary to maintain cohesiveness of the mass. Thereafter, the molded mass is frozen again to a lower temperature suitable for slicing into predetermined portions. This further freezing may take an additional 10 to 16 hours. Finally, the product is packaged for shipment while the temperature is maintained at the necessary low level.

Compounding the problem of processing meats in the aforesaid manner is the fact that raw meat has a high water content, which results in substantial expansion and contraction of the product mass during decreases and increases of temperature. Containment of the meat during changes in temperature has therefore been a problem of considerable moment.

It is a general object of the present invention to provide an apparatus that will simplify the aforesaid processing of shaped meats through the elimination of one or more steps from previously known processes. More specifically, it is an object of the present invention to provide an apparatus for freeze-shaping products using a wide variety of temperatures and an apparatus that can contain the products during wide variations in temperature while maintaining the integrity of the shaped product.

It is a further object of the present invention to provide meat and poultry product shaping equipment which is easy to use, inexpensive to manufacture and adaptable to a wide variety of conventional and accepted product shapes.

SUMMARY OF THE INVENTION

The foregoing objects and advantages of the present invention are achieved through the provision of an elongated enclosure having the cross-sectional shape of a conventional meat cut, including, but not limited to, a chop, strip steak, veal medallion or the like. The enclosure has access means for allowing insertion of a product mass in its unfrozen state. Insertion may be accomplished by hand or mechanical extrusion through a hinged door or other closable opening. The enclosure is characterized by a capability to assume multiple volumes of the same general shape so as to allow for volumetric thermal expansion of the contained product during freezing. Expansion is accomplished by making portions of the enclosure wholly or partially overlapping with other portions of the enclosure in one stage of operation, with the overlapping portions being of such a size as to allow expansion of the enclosure without total separation of the overlapping portions and without leakage of the contained product through a gap. Various means are provided to maintain pressure on the contained product by providing resistance to the separation of the overlapping portions of the enclosure during expansion of the contained product. This resistance prevents destruction of the enclosure that would otherwise result from thermal expansion of the contained product. At the same time the enclosure maintains adequate pressure on the contained product so as to expel excessive moisture, press out any existing voids and in general, press the product into the desired shape defined by the enclosure generally.

Through provision of the aforesaid apparatus, which is described more fully below, the processing of frozen food products into desirable shapes is greatly simplified. The restructured food products may be inserted into the enclosure without prior freezing and thereafter cooled through a single operation. Tempering, extrusion and other forms of shaping heretofore used are unnecessary. The frozen product may be taken directly from the enclosure after freezing and thereafter sliced and packaged for shipment or sale, thus achieving a substantial reduction in processing time and saving of energy.

DESCRIPTION OF THE DRAWINGS

For a more complete understanding of this invention one should now refer to the two embodiments illustrated in greater detail in the accompanying drawings and described below as examples of the invention. In the drawings.

While the invention will be described in connection with two preferred embodiments, it will be understood that the invention is not limited to these embodiments but rather covers all alternatives, modifications and equivalents as may be within the spirit and scope of the invention as defined by the appended claims.

DETAILED DESCRIPTION OF THE DRAWINGS AND THE PREFERRED EMBODIMENTS

Figure 1:
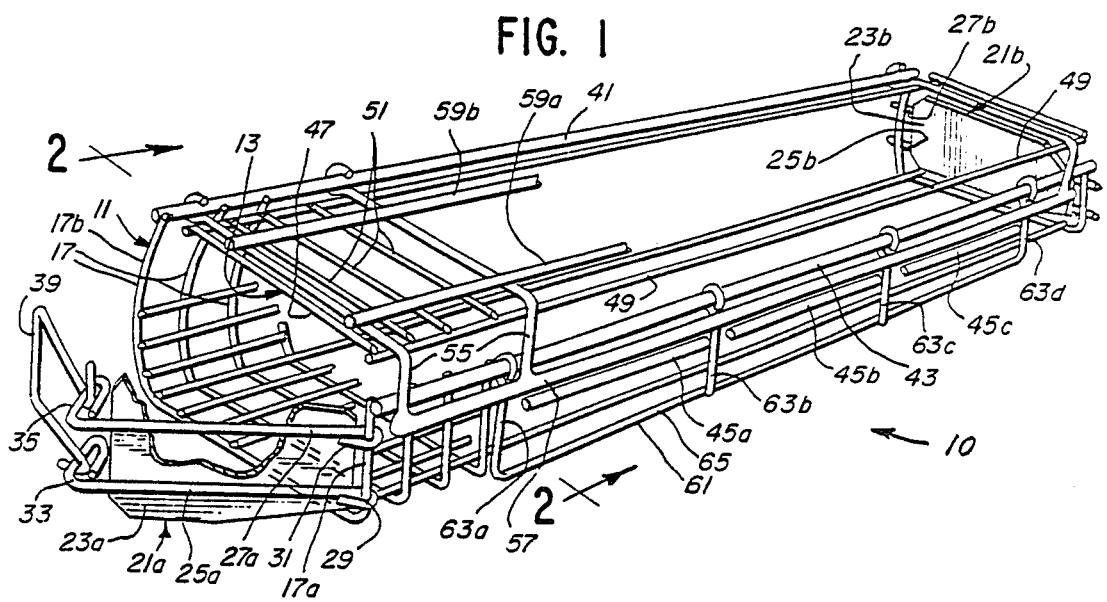
FIG. 1 is a perspective view of one embodiment of the expandable enclosure of this invention.
Figure 2:
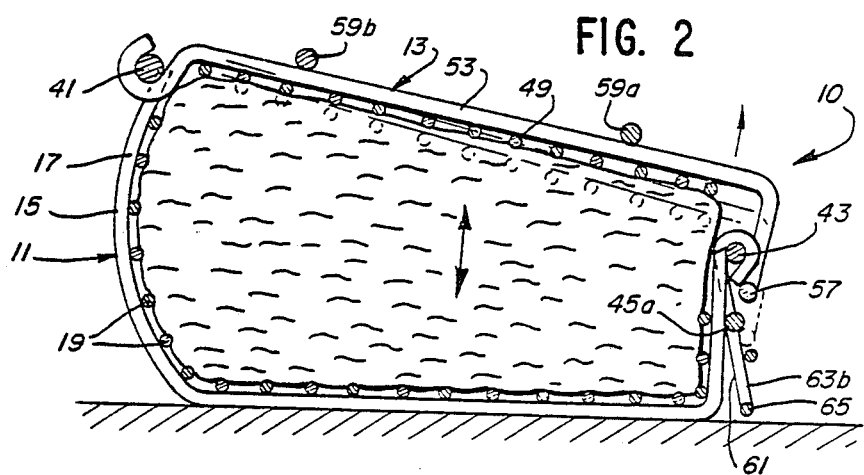
FIG. 2 is a sectional view taken along line 2—2 in FIG. 1 and showing the expandable enclosure filled with a mass of processed meat or poultry product and its cover in the closed position.
Figure 3:
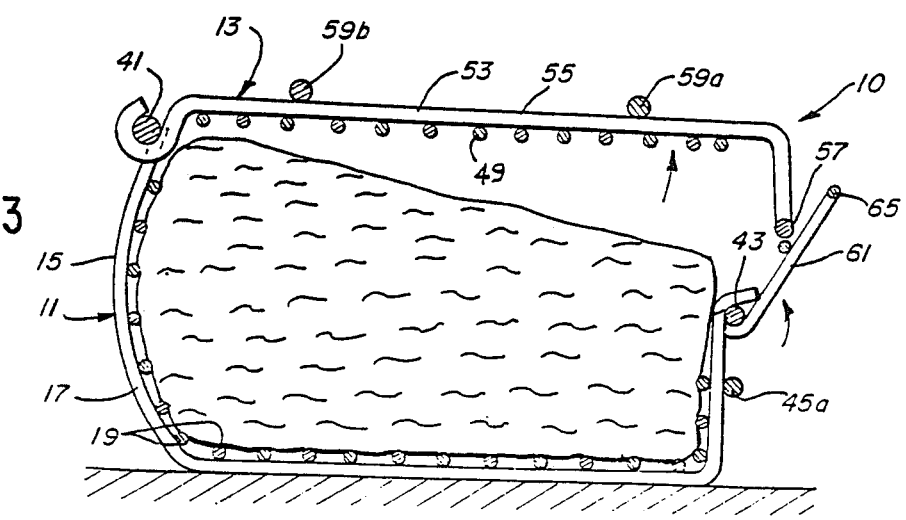
FIG. 3 is the sectional view of FIG. 2 showing the expandable enclosure with its cover in an open position.

Turning now to the drawings, FIGS. 1-3 show the first preferred embodiment of the expandable enclosure of the present invention at 10. The enclosure generally comprises a bottom housing 11 with a top cover 13. The enclosure is used to contain a mass of processed meat or poultry products (See FIGS. 2 and 3) during decreases and increases in temperature and for freeze forming this mass into a block with the cross-sectional shape of a desired conventional meat cut. In this embodiment the housing 11 and its cover 13 define an enclosure having the cross-sectional shape of a strip steak (See FIGS. 2 and 3). One will appreciate, however, that the enclosure can have the cross-sectional shape of any conventional meat cut, including the shapes of meat cuts such as lamb and pork chops, or the like.

In the illustrated form, both the housing 11 and the cover 13 are frameworks of latticed metal wire. The housing 11 includes a channel-like basket 15 into which the user of the enclosure places the mass of processed meat or poultry products. The basket 15 has a flat bottom, one short and straight vertical sidewall and a taller, slightly convex sidewall. Its walls consist of generally U-shaped ribs 17 spaced apart along the length of the enclosure and of longitudinal bars 19. The longitudinal bars 19 are spaced apart along the length of the ribs 17 and attached to the ribs by any suitable method, e.g., spot welding. The openings between the latticed ribs and longitudinal bars allow the excess moisture contained within the mass of processed meat or poultry products to drain out of the enclosure or evaporate. They allow the air in the voids of the mass to escape; and they allow maximum exposure of the contained product to ambient air.

Pursuant to the invention, the housing 11 also includes a door-like endwall 21a disposed at one end of the basket 15 and a stationary endwall 21b disposed at the opposite end (See FIG. 1), both used to contain the product mass. The endwall 21a opens to allow the user of the enclosure to fill the enclosure with the product mass and to remove the mass from the enclosure after freeze forming. Although endwall 21b is stationary, one skilled in the art can appreciate that it too can be hinged to open and close.

The endwall 21a includes a thin, metal plate 23a which serves to block the meat or poultry mass, contain it within the basket 15, and provide a flat end for the product mass to minimize end cut loss. Alternatively, a fine metal screen or grating may serve the same function as this plate. This plate 23a is welded to and supported by two parallel cross-bars 25a and 27a having ends 29 and 31, respectively, that loop around the section 17a of a rib 17 at the distal end of basket 15 to hingedly connect the plate 23a to the basket 15. The hinged connection allows the user of the enclosure 10 to quickly open and close the endwall 21a without having to remove it away from the enclosure and risk loosing it. Loops 33 and 35 formed out of the opposite ends of cross-bars 25a and 27a, respectively, serve to secure the unhinged end of the endwall 21a to basket 15 by engaging and overriding the section 17b of the same rib 17. The endwall 21a includes a wire handle 39 for moving the endwall 21a into an open or closed position. This handle 39 generally has a U-like shape with hooked ends passing through loops 33 and 35 and hingedly connecting the handle to the cross-bars. The plate 23a has a shape similar to the cross-sectional shape of the basket 15; and it is slightly reduced to fit into and enclose the end of the basket 15 and prevent the mass contained by the housing 11 from escaping.

The endwall 21b comprises a metal plate 23b welded to two support bars 25b and 27b that are welded to the end of basket 15 opposite the end with endwall 21a.

In addition to the ribs 17 and the longitudinal bars 19, the basket 15 of the housing 11 includes a longitudinal bar 41 welded to the ribs 17 along the top edge of the basket's taller sidewall (See FIGS. 2 and 3); a longitudinal bar 43 welded to the top edge of the right or shorter sidewall (See FIGS. 2 and 3); and a group of longitudinal bars 45a, 45b and 45c, welded in straight line alignment along the middle of the basket 15 midway between the bar 43 and the bottom of the basket. The bars 41, 43 and 45a-c are generally of greater diameter than the ribs 17 or the bars 19, and they function to secure the cover 13 to the housing 11.

In this construction, the cover 13 consists of a flat, elongate framework 47 of latticed longitudinal bars 49 and short cross-bars 51 welded to the bottom of another framework 53. The framework 47 is the wall of the cover 13 which restricts the product mass contained in the enclosure and prevents it from overflowing the housing 11. The framework 53 provides the structural integrity to the cover 13 and the overlapping engagement, securing the cover 13 to the housing 11 and allowing the cover to displace and the inside volume of the enclosure to expand. The framework 53 includes resilient L-shaped bar members 55 spaced along the length of the cover 13. One end of each of these members 55 forms a loop around the bar 41 to hingedly connect the cover 13 to the housing 11 and allow the user to open and close the cover without having to remove it away from the housing. The other end of each of these members 55 is welded to a horizontal locking bar 57 which extends along the entire length of the enclosure and which serves as a latch to secure the cover 13 in place over the housing 11. To add rigidity to the cover 13, the framework 53 includes bars 59a and 59b welded to members 55 and extending along the entire length of the enclosure. The framework 47 is welded to the bottom of the members 55.

To secure the cover 13 over the housing 11, the user of this device pushes down on the cover until the locking bar 57 overrides the bars 43 and 45a-c and snaps into place below the bars 45a-c. The user then fills the enclosure with processed meat or poultry product through the opening in the side of the enclosure which sidewall 21a closes. During freezing, as the product mass expands it pushes upon the bottom of the cover 13, flexing the members 55 and forcing the locking bar 57 to override the bars 45a-c. The locking bar 57 snaps into place between the bar 43 and the bars 45a-c, allowing the expansion of the mass but preventing it from overflowing the housing 11. Thus, with the displacement of the cover 13, the enclosure 10 expands to accommodate the expansion of the product mass that it contains. However, the displacement is small so that the enclosure 10 does not lose the general cross-sectional shape it had before the displacement of the cover 13—the shape of a strip steak.

The resistance provided by the cover 13 and its locking bar 57 to the expanding product mass helps press out the excess moisture and the voids in the mass and gives the mass the desired shape. The excess moisture and trapped air escape from the enclosure 10 through the openings between the latticed metal bars of the housing 11 and the cover 13.

To help disengage the cover 13 from the closed position so that the user of the enclosure can remove the product mass from the enclosure after freeze forming, the enclosure 10 includes a flap 61 which helps the user disengage the locking bar 57 from the housing 11. The flap 61 comprises vertical hanger bars 63a, 63b, 63c, and 63d hingedly attached to bar 43 and extending downward and welded to a handle bar 65. Hanger bars 63b and 63c extend down through the openings between bars 45a and 45b and 45b and 45c, respectively. By holding the handle bar 65 and pulling up on it, the user of the device can bring the hanger bars 63a-d into contact with the underside of locking bar 57 and force it over bar 43.

In using this embodiment of the enclosure of the present invention, the user first processes the meat or poultry pieces using an extruding device. This extruding device has a nozzle having the same general cross-sectional, but slightly reduced, shape as that of the enclosure and approximately the same length. After securing the cover 13 over the housing 11, the user inserts the nozzle into the enclosure through the opening in the side of the enclosure which sidewall 21a closes. The user fills the enclosure by pulling the nozzle out of the enclosure as the nozzle injects the processed mass into the enclosure and fills it. Alternatively, the user may fill the enclosure by hand through the side or top openings of the housing 11. In addition, the user may use a liner between the product mass and the walls of the enclosure to minimize product loss. After filling the enclosure, the user closes the endwall 21a.

The user then places the enclosure in a freezer to freeze the product mass for a period of time so that the center of the mass reaches a predetermined temperature necessary to maintain cohesiveness of the mass. As the product mass freezes, it expands, forcing the cover to move up and the locking bar 57 to override the bars 45a-c and move up to and below the bar 43. However, at the same time the cover provides resistance to the expanding mass and presses out voids and excess moisture contained in it. After freezing the product mass for a period necessary to maintain cohesiveness, the mass assumes the shape of the enclosure in the form of a log with a cross-section having the shape of a strip steak. After freeze forming, the user takes the freeze formed block of meat or poultry product out of the enclosure by disengaging the cover 13 from the housing 11 using the flap 61 and swinging the cover backward sway from the top of the housing; opening the endwall 21a by pulling on the wire handle connected to the endwall and swinging it away from the ends of the housing 11; and removing the block from the basket 15. The user of the enclosure may then cut the block or log into controlled portions for shipment or display.

Figure 4:
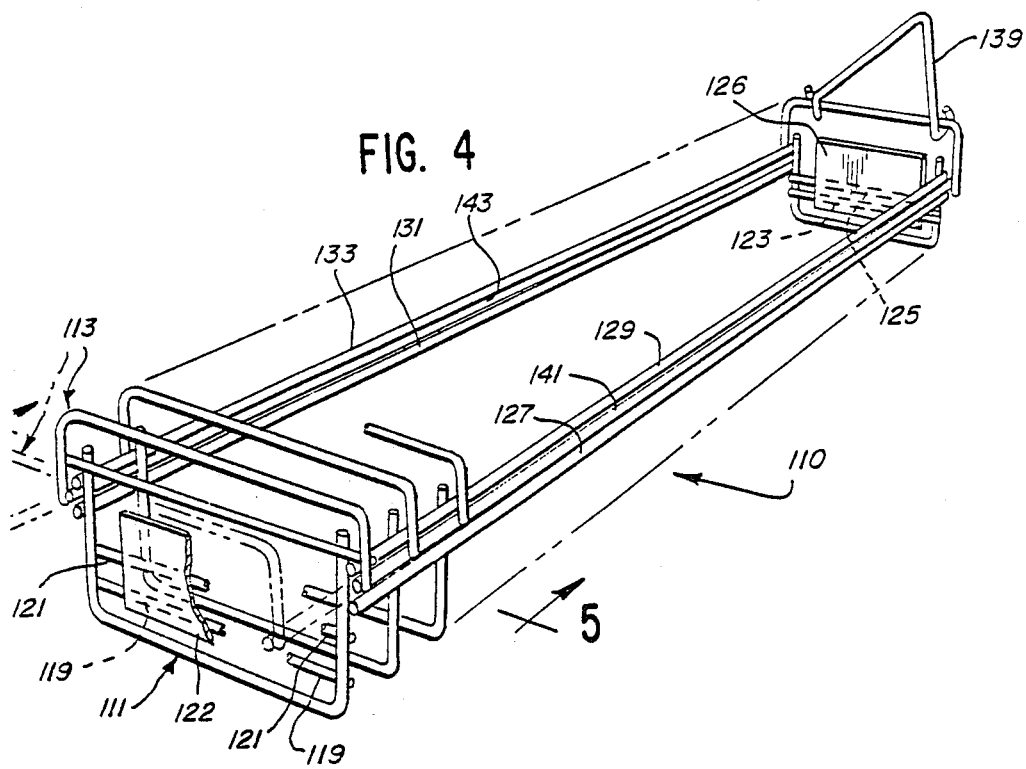
FIG. 4 is a perspective view of another embodiment of the expandable enclosure of the present invention.
Figure 5:
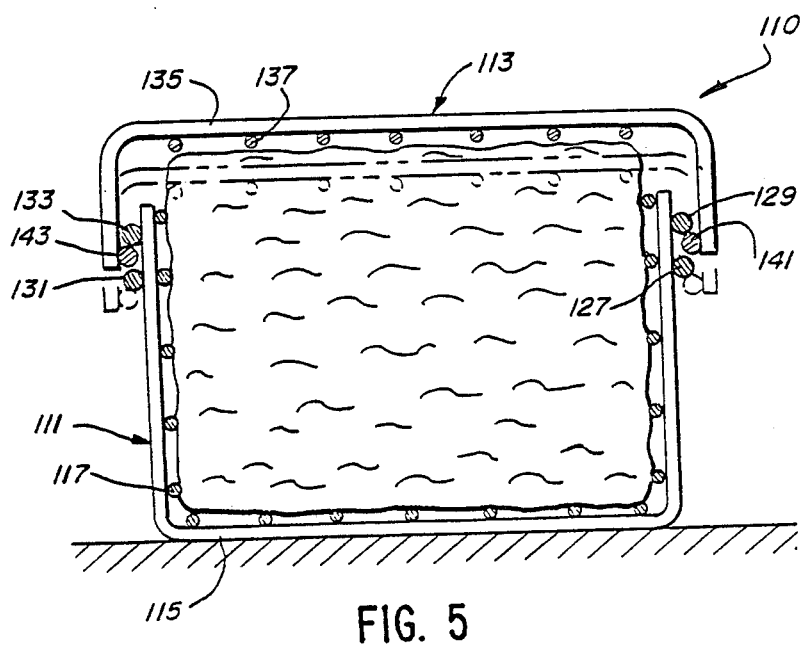
FIG. 5 is a sectional view taken along line 5—5 in FIG. 4 and showing this second embodiment of the expandable enclosure filled with the product mass and its cover in the closed position.

FIGS. 4 and 5 illustrate an alternative embodiment of the enclosure of the present invention at 110. This enclosure also comprises a bottom housing 111 and a top cover 113 for freeze forming a product mass.

In this alternative embodiment the housing 111 and its cover 113 define an enclosure having the cross-sectional shape of a square meat cut. The housing 111 is an elongate channel-like basket with a flat bottom and straight, vertical sides of equal height. It contains the product mass of meat or poultry products that the enclosure forms into a cohesive log. The housing 111 is a framework of latticed metal bars that consists of U-shaped ribs 115 spaced apart along the length of the enclosure and of longitudinal bars 117 which are spaced apart along the length of the ribs 115 and attached to the ribs by a suitable method, e.g., spot welding. The bars 117 extend along the entire length of the enclosure. To prevent the outflow of the product mass at its two ends, the housing 111 also includes cross-bars 119 and 121 and metal plate 122 defining one endwall of the housing and cross-bars 123 and 125 and metal plate 126 defining the other (See FIG. 4). In addition, the housing 111 includes longitudinal bars 127 and 129 welded to the top outer end of one side of the housing and longitudinal bars 131 and 133 welded to the top outer end of the opposite side of the housing. These two sets of locking bars function to secure the cover 113 to the housing 111 and to allow the enclosure to expand.

The cover 113 is also an elongate channel-like basket sized for overlapping engagement with the sides of the housing 111. It restricts the product mass contained in the enclosure 110 and prevents it from overflowing the housing 111. Like the housing 111, it, too is a framework of latticed metal bars that has a flat top, straight vertical sides which overlap the corresponding sides of the housing 111, and open ends. It consists of U-shaped ribs 135 spaced apart along the length of the enclosure and of longitudinal bars 137 which are spaced apart along the length of the ribs 135 and attached to the ribs by spot welding. The cover 113 includes a V-shaped wire handle 139 hingedly attached to a rib 135 at one distal end of the cover. With this handle the user of the enclosure may place the cover 113 in place over the housing 111. The cover 113 also includes a longitudinal bar 141 welded to the bottom inner end of one side of the cover and a longitudinal bar 143 welded to the bottom inner end of the opposite side of the cover. Bar 141 coacts with bars 127 and 129 of the housing 111 and bar 143 coacts with bars 131 and 133 of the housing to secure the cover 113 to the housing and to allow the enclosure to expand as the product mass expands and pushes up on the cover 113. The resistance provided by the cover 113 and the coacting bars to the expanding product mass helps press out the excess moisture and the air in the voids of the mass though the openings between the metal bars of the housing 111 and its cover 113; and thus it helps shape the product.

In using the second embodiment of the enclosure of the present invention, the user first fills the housing 111 with a meat or poultry product previously flaked, chopped, ground, or otherwise processed into a consistent mass. Next, the user places the cover 113 into a position of overlapping engagement with the housing 111 by sliding the cover over the housing after inserting bar 141 beneath bar 127 and bar 143 beneath bar 131. The user may also engage the cover 113 by placing it over the housing and pressing down on it until its bars 141 and 143 override the housing's bars 127 and 131, respectively. The user then places the enclosure in a freezer to freeze the product mass for a period of time so that the center of the mass reaches a predetermined temperature necessary to maintain cohesiveness of the mass. As the product mass freezes, it expands, forcing the cover 113 to flex and move upward. This causes the bars 141 and 143 of the cover 113 to override the bars 127 and 131 of the housing and move to the bottom of the bars 129 and 133, thus increasing the volume of the enclosure 110. However, at the same time the cover provides resistance to the expanding mass, presses out voids and excess moisture contained within it, and shapes it. After freezing the product mass for a period necessary to maintain cohesiveness of the mass, the mass assumes the shape of the enclosure 110 in the form of a log with a cross-section having the shape of a square or rectangular meat cut. After freeze forming, the user takes the freeze formed block or log of meat or poultry product out of the enclosure 110 by disengaging the cover 113 from the housing 111 using the wire handle 139 to pull and slide the cover 113 away from the housing, and removing the block out of the housing 111. The user of the enclosure may then cut the block into controlled portions for shipment or display.

While only two embodiments of the invention have been shown, it will be understood, of course, that the invention is not limited thereto since modifications may be made and other embodiments of the principles of this invention will occur to those skilled in the art to which the invention pertains, particularly upon considering the foregoing teachings. For example, those skilled in the art will appreciate that one may use sheet metal or plastic material to form the walls of the housing and the cover of the enclosure as long as these materials exhibit the resiliency and strength characteristics of the grating structures described above. Additionally, one may vary the shapes of the housing and its cover to form elongate blocks of meat and poultry product having the cross-sectional shape of other cuts such as the wide variety of other conventional steak cuts, lamb and pork chops, or poultry and veal cuts. Furthermore, one may vary the shapes of the housing and its cover so that the entire enclosure forms pork or beef roasts, or the like. It is, therefore, contemplated by the appended claims to cover any such modifications and other embodiments as incorporate those features which constitute the essential features of this invention within the true spirit and scope of the following claims:

What is claimed is:

1. An expandable enclosure for containing a mass of processed meat or poultry products, including voids and moisture therein, during decreases and increases of temperature, said enclosure comprising:
    an elongate housing defining a plurality of first openings for venting fluids and at least one elongate second opening for receiving said mass therethrough;
    cover means normally closing said second opening, said cover means being displaceable by said mass as said mass expands during freezing; and
    means for fastening said cover means to said housing and for allowing said cover means to be displaced from at least one discrete predetermined position to another discrete predetermined position under the force of the product mass as said mass expands during freezing, said enclosure maintaining its generaly cross-sectional shape after said cover means is displaced;
    wherein said cover means normally engages said housing along opposite edges of said second opening and includes a portion that overlaps said housing to prevent leakage of the contained mass as said mass expands and displaces said cover means; and
    said means for fastening said cover includes at least one raised portion of said cover means and a plurality of spaced raised portions of said housing providing for the displacement of the cover means from at least one discrete predetermined position to another discrete predetermined position.

2. An expandable enclosure for containing a mass of processed meat or poultry products, including voids and moisture therein, during decreases and increases of temperature, said enclosure comprising:
    an elongate housing formed of a framework of lattice metal bars defining a plurality of first openings for venting fluids and at least one elongate second opening for receiving said mass therethrough;
    cover means formed of a framework of lattice metal bars normally closing said second opening, said cover means being displaceable by said mass as said mass expands during freezing; and
    means for fastening said cover means to said housing and for allowing said cover means to be displaced from at least one discrete predetermined position to another discrete predetermined position under the force of the product mass as said mass expands during freezing, said enclosure maintaining its general cross-sectional shape after said cover means is displaced.

3. An expandable enclosure as in claim 2, wherein said cover means normally engages said housing along opposite edges of said second opening and includes a portion that overlaps said housing to prevent leakage of the contained mass as said mass expands and displaces said cover means.

4. An expandable enclosure as in claim 2, wherein said housing defines an opening located at least at one of its ends that includes a corresponding wall portion hingedly engaging said housing, means for attaching said wall portion to said housing and means for closing said end opening.

5. An expandable enclosure as in claim 2, wherein said means for fastening said cover includes at least one raised portion of said cover means and a plurality of spaced raised portions of said housing providing for the displacement of the cover means from at least one discrete predetermined position to another discrete predetermined position.

6. An expandable enclosure for containing a mass of processed meat or poultry products, including voids and moisture therein, during decreases and increases of temperature, said enclosure comprising:
    an elongated housing defining a plurality of first openings for venting fluids and at least one elongate second opening for receiving said mass therethorugh;
    cover means normally closing said second opening, said cover means overlapping said housing and being displaceable by said mass as said mass expands during freezing;

means for fastening said cover means to said housing and for allowing said cover means to be displaced from at least one discrete predetermined position to another discrete predetermined position under the force of the product mass as said mass expands during freezing, said enclosure maintaining its general cross-sectional shape after said cover means is displaced; and means for separating said cover from said housing so that said cover may be moved from a closed position to an open position, said separating means hingedly attached to said housing beneath a portion of said cover means overlapping said housing.

7. An expandable enclosure as in claim 6, wherein said cover means normally engages said housing along opposite edges of said second opening and includes the portion that overlaps said housing to prevent leakage of the contained mass as said mass expands and displaces said cover means.

8. An expandable enclosure as in claim 6, wherein said housing defines an opening at least at one of its ends that includes a corresponding wall portion hingedly engaging said housing, means for attaching said wall portions to the housing and means for closing said end opening.

9. An expandable enclosure as in claim 6, wherein said means for fastening said cover includes at least one raised portion of said cover means and a plurality of spaced raised portions of said housing providing for the displacement of the cover means from at least one discrete predetermined position to another discrete predetermined position.

* * * * *